Feb. 8, 1949.                    C. R. STONE                    2,461,354
                    FASTENING MEANS FOR DIRECT LIFT
                       WASTE FITTINGS OR THE LIKE
                         Filed Sept. 13, 1945
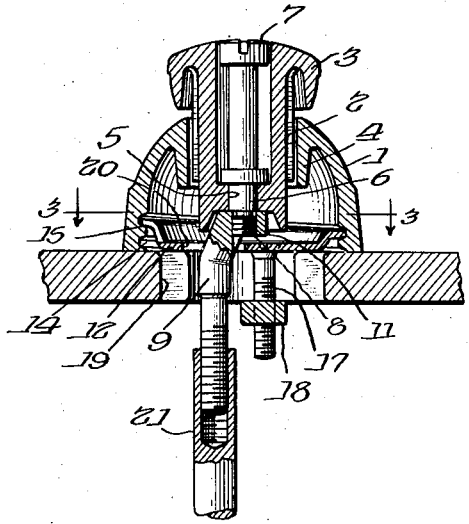
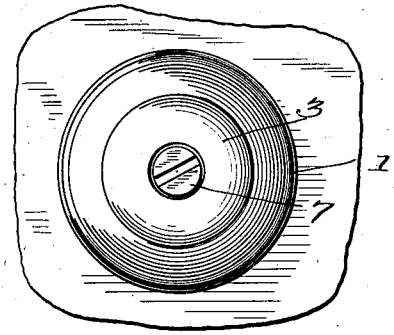
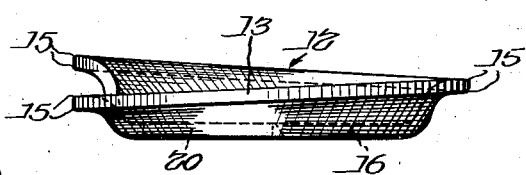
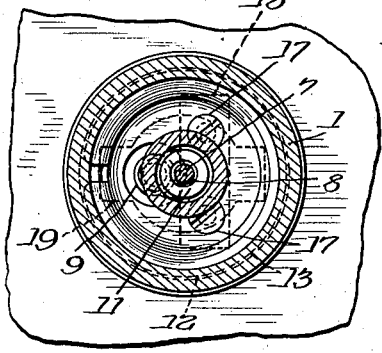
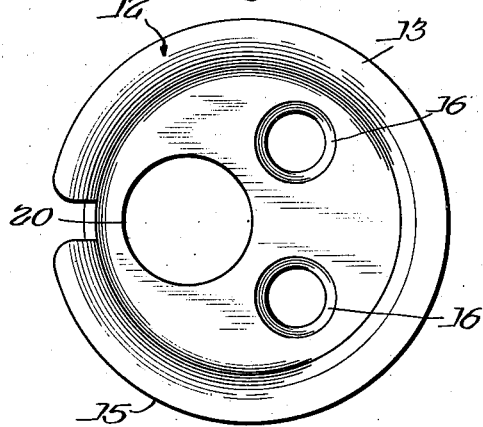
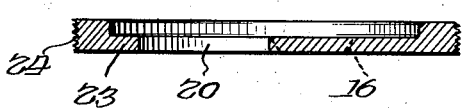
Inventor:
Carl R. Stone:
By: Joseph O. Lange
              Atty.

Patented Feb. 8, 1949

2,461,354

UNITED STATES PATENT OFFICE 2,461,354

FASTENING MEANS FOR DIRECT LIFT WASTE FITTINGS OR THE LIKE

Carl R. Stone, Chicago, Ill., assignor to Crane Co., Chicago, Ill., a corporation of Illinois Application September 13, 1945, Serial No. 616,058

6 Claims. (Cl. 4—191)

1

This invention relates to fastening means. More particularly it is concerned with novel fastening means for use on escutcheons or the like type of plate applied to a lavatory pop-up waste fitting.

Heretofore it has been a problem to assemble with a lavatory or other plumbing fixture an escutcheon in which the application thereof is relatively easily adjustable to the fixture and in which the means of assembly therewith is comparatively simple and cheap.

It is therefore an important object of this invention to provide a fastening means for an escutcheon or the like, preferably consisting of a round pressed metal base plate having a raised and beveled, spiral shaped edge forming a coarse thread for engagement with an inner similarly formed recess of the escutcheon.

It is a further important object to provide for the assembly of a simple clamp bar to a base plate, preferably by means of a plurality of machine screws or similar holding means and thereby facilitate the attachment of the escutcheon or cover with or without the lever actuated waste mechanism.

It is a further important object of this invention to provide a simple assembly for a lavatory or other similar fixture and in addition to permit a more secure fastening, relying upon the inherent resilience of the base plate combined with multiple screw assembly to accomplish such latter advantage.

Other objects and advantages will become clearly apparent upon proceeding with a description of the article considered in light of the accompanying drawings, in which Fig. 1 is a fragmentary sectional assembly view of an escutcheon embodying my invention.

Fig. 2 is a fragmentary plan view.

Fig. 3 is a sectional view taken on the line 3—3 of Fig. 1.

Fig. 4 is an enlarged exterior view of one form of novel base plate.

Fig. 5 is a plan view of the structure shown in Fig. 4.

Fig. 6 is a modified form of the base plate.

Similar numerals refer to similar parts in the several views.

Referring now to Fig. 1, the escutcheon or cover 1 is shown to be of generally hemispherical form, although for purposes of this invention it need not necessarily be of such shape. It is provided with the fluted opening 2 within which the non-rotatable knob 3 is slidably movable. In order to provide for a substantial length to the fluted

2 opening 2 the escutcheon is preferably made with the skirt 4 extending within the hollow of the escutcheon. At the lower portion of the knob 3 the latter is apertured as at 5 to receive the shank 6 of the shouldered screw 7. Below the shoulder, the lower portion of the shank 6 is threaded as at 8, to which the rod 9 having the offset head portion 11 is suitably attached as indicated. The base plate 12, as shown more clearly in Fig. 4 is provided with a raised and beveled, spiral shaped edge 13 which forms a thread for engaging the similarly formed spiral recess 14 of the escutcheon. The base plate edges indicated at 15 are preferably smooth and free from burrs and the base plate 14 is provided with two countersunk holes 16 to receive the flat machine screws 17 for threadedly supporting the bar 18, the latter member spanning the key hole aperture 19 of the fixture. The base plate is also provided with the aperture 20 to allow for the projection therethrough of the rod 9. The offset portion of the rod 9 may be suitably attached to a closure member of waste outlet, not shown, as indicated at 21. Thus by raising and lowering the knob 3 the drain outlet of a plumbing fixture may be suitably controlled.

It will thus be apparent that in such instances in which a relatively frangible material such as a plastic is employed, the novel base plate and assembly of my invention constitutes a substantial improvement over the prior art. It will also be apparent that depending upon the thickness of the plate 12 the escutcheon may be mounted with suitable resilience and flexibility, avoiding previous breakage and objectionable distortion.

It should of course be understood that a metal escutcheon or cover may be used instead of a plastic escutcheon. Also instead of having a pressed sheet metal construction for the base plate which on its periphery forms a full coarse thread, a modified form of flat base plate 23 may be used as in Fig. 6, having a relatively fine thread 24 on its outside edge to accomplish a similar result.

Thus a relatively simple and economical method of attachment has been provided. However, it will also be apparent that the specific structure may vary substantially and it is therefore the desire to be limited only by the scope of the appended claims interpreted in light of the prior art.

I claim:

1. In fastening means, the combination of an escutcheon suitable for mounting over a key-hole aperture, a base plate, the under portions of the escutcheon being formed to receive the said base plate, the said base plate having means for attachment to a fixture or the like including a clamp bar to span the aperture, the said base plate having spirally ascending means on its outer periphery for engagement with the under portion of said escutcheon upon predetermined rotation of the latter member; the clamp bar having means for attachment to the said base plate to hold the said escutcheon against further rotation.

2. In a fastening means, the combination of an escutcheon suitable for mounting over a substantially key-hole formed aperture, a base plate, the escutcheon being hollow to receive the said base plate, the said base plate having means for attachment to a fixture or the like; the escutcheon having an annular recess with projecting means for engagement by the said base plate, an operating handle reciprocably movable within the escutcheon and the said base plate; spirally extending means on the base plate for said engagement with the said escutcheon and means cooperating with the said base plate for holding the said escutcheon against substantial movement.

3. In a fastening means of the character described; the combination including an apertured escutcheon, a base plate, the escutcheon being adapted to receive the said base plate, the said base plate having means for attachment to a fixture or the like; means on its outer periphery for engagement with the said escutcheon; a clamp bar for assembly with the said base plate; a divided actuating rod reciprocably movable within the said escutcheon and base plate, the said base plate having an offset aperture relative to the said escutcheon for extension of said divided actuating rod therethrough; and offset means connecting a portion of the actuating rod movable within the escutcheon and that portion of the said rod movable within the aperture of the said base plate.

4. The combination of an escutcheon suitable for mounting over a substantially key-hole aperture on a lavatory or the like; a base plate spanning the aperture, the escutcheon being formed to receive the said base plate, the said base plate having means for attachment to a fixture or the like and having thread means on the outer periphery of a thickened portion of the base plate for engagement with the said escutcheon, and a clamp bar suitable for spanning an inner end portion of the aperture and having means for attachment to the said base plate.

5. The combination of an escutcheon, a base plate with an upturned flange portion, the escutcheon being recessed to receive the said base plate, the flange portion of the said base plate cooperating with the said escutcheon for attachment of the latter member to the said base plate, annular cam-like means on the outer periphery of said flange portion for engagement with the said escutcheon and a substantially radially extending threaded clamp bar below the base plate, an actuating rod movable relative to the said escutcheon and base plate, the said base plate being apertured for extension of said actuating rod therethrough.

6. In combination, an apertured escutcheon with a recess on its under side, a base plate below the said escutcheon, the escutcheon being adapted to receive the said base plate in the recess; the said base plate having means for attachment to a fixture or the like and peripheral means for engagement with the said escutcheon, an elongated clamp bar with a plurality of threaded means for assembly with the said base plate, an offset actuating rod, the said escutcheon and base plate being apertured in staggered relation for extension of said offset rod therethrough.

CARL R. STONE.

REFERENCES CITED

The following references are of record in the file of this patent:

UNITED STATES PATENTS

| Number | Name | Date |
|---|---|---|
| 329,947 | Putnam | Nov. 10, 1885 |
| 1,677,793 | Mueller et al. | July 17, 1928 |
| 2,137,496 | Klein | Nov. 22, 1938 |

FOREIGN PATENTS

| Number | Country | Date |
|---|---|---|
| 582,916 | Germany | Aug. 24, 1933 |